(12) United States Patent
Marlier et al.

(10) Patent No.: US 10,369,846 B2
(45) Date of Patent: Aug. 6, 2019

(54) TREAD FOR HEAVY VEHICLE TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Fabien Marlier, Clermont-Ferrand (FR); Maxime Rolland, Clermont-Ferrand (FR); Damien Bardin, Clermont-Ferrand (FR); Christophe Gayton, Clermont-Ferrand (FR); Tony Zivkovic, Clermont-Ferrand (FR)

(73) Assignees: Compagnie Generale Des Etablissments Michelin, Clermont-Ferrand (FR); Michelin Recherche Et Tehcnique, S.A., Granges-Paccot (CH)

( * ) Notice: Subject to any disclaimer, the term of this patent is extended or adjusted under 35 U.S.C. 154(b) by 334 days.

(21) Appl. No.: 15/115,968

(22) PCT Filed: Feb. 2, 2015

(86) PCT No.: PCT/EP2015/052037
§ 371 (c)(1),
(2) Date: Aug. 2, 2016

(87) PCT Pub. No.: WO2015/114128
PCT Pub. Date: Aug. 6, 2015

(65) Prior Publication Data
US 2017/0174008 A1    Jun. 22, 2017

(30) Foreign Application Priority Data
Feb. 3, 2014   (FR) ..................... 14 00295

(51) Int. Cl.
*B60C 11/03*     (2006.01)
*B60C 11/12*     (2006.01)
(Continued)

(52) U.S. Cl.
CPC ............ *B60C 11/03* (2013.01); *B60C 1/0016* (2013.01); *B60C 11/0302* (2013.01);
(Continued)

(58) Field of Classification Search
CPC . B60C 11/03; B60C 11/0306; B60C 11/0309; B60C 11/032; B60C 11/0323;
(Continued)

(56) References Cited

U.S. PATENT DOCUMENTS

2014/0110025 A1    4/2014 Hidrot et al.
2014/0290814 A1*  10/2014 Audigier ............. B60C 11/0306
                                                    152/209.17

(Continued)

FOREIGN PATENT DOCUMENTS

FR          2995253 A1    3/2014
WO   WO 2012/130735    * 10/2012   ......... B60C 11/0306
WO   WO 2013/014253    *  1/2013   ........... B60C 11/032

*Primary Examiner* — Eric Hug
(74) *Attorney, Agent, or Firm* — Dickinson Wright PLLC

(57) ABSTRACT

The tread has a total width W and two main grooves. The main grooves divide the tread into a middle region and edge regions. The middle region has an axial width Lm that is 45% to 70% of the total width W. The volume void ratio of the tread when new is less than 17%. An internal surface extends parallel to the tread surface when new and is in contact radially with the innermost points of the deepest main grooves. The middle part has a plurality of transverse sipes, each of which has a depth at least equal to the depth of the main grooves. The transverse sipes open into the main grooves. The middle region has a volume void ratio when new that is less than half the total volume void ratio of the (Continued)

tread, and at least one circumferential channel appears when the tread becomes part worn.

9 Claims, 2 Drawing Sheets

(51) Int. Cl.
*B60C 11/04* (2006.01)
*B60C 11/11* (2006.01)
*B60C 1/00* (2006.01)

(52) U.S. Cl.
CPC .......... *B60C 11/032* (2013.01); *B60C 11/033* (2013.01); *B60C 11/0323* (2013.01); *B60C 11/0332* (2013.01); *B60C 11/04* (2013.01); *B60C 11/042* (2013.01); *B60C 11/11* (2013.01); *B60C 11/1204* (2013.01); *B60C 11/1236* (2013.01); *B60C 2011/036* (2013.01); *B60C 2011/0337* (2013.01); *B60C 2011/0346* (2013.01); *B60C 2011/1209* (2013.01); *B60C 2011/129* (2013.01); *B60C 2200/06* (2013.01)

(58) Field of Classification Search
CPC ............... B60C 11/033; B60C 11/0332; B60C 2011/036; B60C 11/11; B60C 2200/06; B60C 11/12; B60C 11/1236; B60C 2011/1209; B60C 11/04
USPC .... 162/209.1, 209.3, 209.17, 209.18, 209.27
See application file for complete search history.

(56) References Cited

U.S. PATENT DOCUMENTS

2014/0299242 A1* 10/2014 Chauvin ............... B60C 11/032
152/209.8
2015/0059943 A1    3/2015 Radulescu et al.

* cited by examiner

TREAD FOR HEAVY VEHICLE TIRE

CROSS-REFERENCE TO RELATED APPLICATIONS

The present invention claims priority to PCT International Patent Application Serial No. PCT/EP2015/052037 filed Feb. 2, 2015 entitled "Tread For Goods Vehicle Tyre," which claims the benefit of FR Patent Application Serial No. 1400295 filed Feb. 3, 2014, the entire disclosures of the applications being considered part of the disclosure of this application and hereby incorporated by reference.

BACKGROUND OF THE INVENTION

1. Field of the Invention

The present invention relates to a tread for a tire for a heavy vehicle and more particularly to the tread pattern of such a tread for a tire intended to be mounted on a drive axle.

2. Related Art

In order to ensure both satisfactory grip and good clearing of water when driving over a roadway covered with water it is necessary to form on a tread a more or less complex system of cuts comprising a plurality of grooves and of sipes. These cuts form a tread pattern design both on the surface referred to as the tread surface that is intended to come into contact with the roadway and within the thickness of the tread.

Patent document FR 1452048 notably discloses how to form wide cuts (grooves) and narrow cuts (sipes). The latter have widths suited to their being able to close up as they enter the contact patch in which the tire is in contact with the roadway. Thus it is possible to benefit from the presence of edge corners while at the same time maintaining sufficient stiffness. A person skilled in the art has therefore to combine a necessary water-clearing volume, consisting of the volumes of voids formed notably by the grooves, with lengths of active edge corners comprising both the edge corners of the grooves and of the sipes.

Publication WO2010/072523-A1 also discloses how to form a reduced void volume when new, this void volume comprising parts intended to form new grooves once a part-worn condition is reached, these void volumes being connected to the grooves formed from new by a plurality of transverse sipes.

Document WO2013/150143 A1 describes a tire for an off-road vehicle comprising a tread in which the overall volume void ratio when new is at most equal to 15% and in which a middle region delimited by circumferential grooves has a void ratio of less than 10%.

The need has arisen to improve further the balancing act between total void volume when new and the lengths of active edge corners in the contact patch, and to do so for different levels of wear.

Definitions

A radial direction in this document means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

An equatorial midplane is a plane perpendicular to the axis of rotation and passing through those points of the tire that are radially furthest from said axis. In the case of a tread, this plane divides the tread in its width-wise direction into two halves of equal width.

A rib is a raised element formed on a tread, this element extending in the circumferential direction and making a complete turn of the tire. A rib comprises two lateral walls and a contact face, the latter being intended to come into contact with the roadway during running.

A cut generically denotes either a groove or a sipe and corresponds to the space delimited by the walls of material facing one another and distant from one another by a non-zero distance (referred to as the "width of the cut"). It is precisely this distance that differentiates a groove from a sipe: in the case of a sipe, this distance is suited to allowing the opposing walls delimiting said sipe to come at least partially into contact at least as the sipe enters the contact patch in which the tire is in contact with the roadway. In the case of a groove, the walls of this groove cannot come into contact with one another under normal running conditions.

A tread has a maximum wearable thickness PMU of material that can be worn away during running; once this thickness is reached either the tire can be regrooved in order to ensure new grooves or the tire is replaced with another, new, tire.

The surface void volume of a tread pattern is equal to the ratio between the surface area of the voids formed by the grooves and the total surface area (contact area of the raised elements and surface area of the voids). A low void ratio indicates a large contact area of the raised elements and a small surface area of voids between these elements.

The volume void ratio of a tread pattern of a tread when new is equal to the ratio of the void volume (voids formed notably by grooves, sipes, cavities) formed in the tread and the total volume of said tread comprising the volume of wearable material and the volume of the voids. A low volume void ratio indicates a low volume of voids in relation to the volume of wearable tread material.

As the tread gradually wears, it is possible to define a remaining void volume and a volume void ratio.

The normal running conditions for the tire or service conditions are those defined notably by the ETRTO Standard or any equivalent standard depending on the country concerned; these service conditions specify the reference inflation pressure corresponding to the load bearing capacity of the tire as indicated by its load index and speed index. These service conditions may also be referred to as "nominal conditions" or "conditions of use".

The contact patch is determined with the tire stationary in conditions that may be the nominal conditions or any other set condition; from this patch it is easy to calculate a mean value for the length of the patch in the circumferential direction.

BRIEF SUMMARY OF THE INVENTION

The present disclosure seeks to propose a tread for a heavy vehicle tire, this tread having a tread pattern design that allows both an improvement in the wearing performance and a reduction in the rolling resistance while at the same time maintaining an appropriate level of grip regardless of the degree of this tread wear.

To that end, one subject of the disclosure is a tread for a heavy vehicle tire, this tread has a total width W and is provided with two grooves of circumferential overall orientation, these grooves dividing the tread into three regions, a middle region and two edge regions axially on each side of the middle region, the middle region having an axial width Lm at least equal to 45% and at most 70% of the total width W of the tread.

This tread has a total void volume when new V0; the middle part of this tread has a total void volume Vm when new.

In addition, this tread is such that the middle part comprises a plurality of transverse or oblique sipes having a depth at least equal to 75% of the depth of the circumferentially oriented main grooves, these sipes opening into the circumferential grooves delimiting the middle region and being formed at a mean spacing Pm.

Advantageously, the volume void ratio of the tread when new is less than 17% and the volume void ratio when new for the middle region is less than half the total volume void ratio of the tread when new. The total volume void ratio of the tread when new being calculated as the ratio between the total void volume and a total volume of tread including both the volume of material and the volume of all the voids, this total tread volume being evaluated between the tread surface when new and an internal surface extending in the tread parallel to the tread surface when new, this internal surface being in contact radially on the inside with those points of the deepest circumferential grooves that are furthest towards the inside of the tread.

Furthermore, this tread in its middle part comprises at least one continuous circumferential channel which is formed under the tread surface when new so that it appears when the tread becomes part worn and forms a new groove.

To make manufacture easier, this at least one channel is extended towards the tread surface when new by a sipe of circumferential main direction.

The number of transverse or oblique sipes in the middle region for a complete turn of the tire is greater than the number of transverse or oblique sipes in each other intermediate or edge region.

For preference, the edge regions have no sipes or grooves to form a circumferentially continuous rib, or may be provided with transversely sipes oriented (directed axially or obliquely) arranged at a mean spacing Ps, this mean spacing Ps being greater than the mean spacing Pm of the sipes formed in the middle region.

For preference, the mean spacing Ps of the transversely or obliquely oriented sipes in the edge region is at least greater than 1.25 times the mean spacing Pm of the sipes in the middle region.

The axial width of the middle region is defined as being the mean axial distance separating the axially innermost walls of the circumferential grooves delimiting this middle region. This middle region has no circumferential groove at all opening onto the tread surface when new.

An oblique orientation here means that each sipe of the middle part makes an angle at least equal to 45 degrees with the circumferential direction.

In an alternative form of the disclosure, the tread as defined further comprises, in its middle part, at least two circumferential sipes, these circumferential sipes being extended into the tread by widened parts forming channels, these channels being intended to form new grooves when the tread reaches a predetermined level of part wear.

Advantageously, at least one of these channels appears at the latest when the degree of part wear reaches 60% of the depth of the main grooves.

Advantageously, the volume void ratio of the tread when new is less than 10% and the volume void ratio of the middle region when new is at most equal to 3%.

The disclosure also relates to a tire provided with a tread as previously defined, this tire being more particularly—although not solely—intended to equip a drive axle of a heavy vehicle.

Further features and advantages of the disclosure will become apparent from the description given hereinafter with reference to the attached drawings which, by way of non-limiting examples, show some embodiments of the subject matter of the disclosure.

DESCRIPTION OF THE FIGURES

In order to make the figures easier to understand, the same reference signs are used for describing alternative forms of the disclosure where these reference signs refer to elements of the same nature, whether this be a structural or indeed a functional nature.

Figure 1:
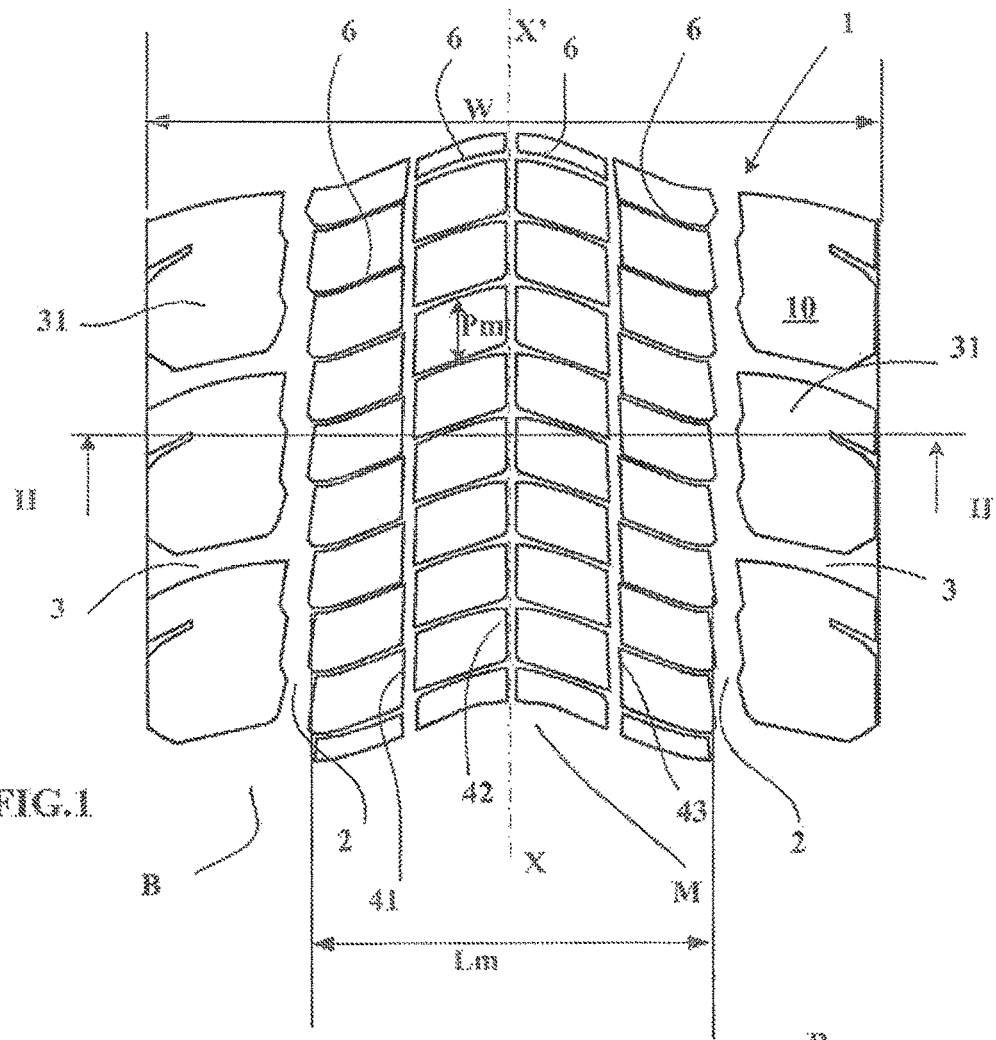
FIG. 1 is a plan view of a tread pattern design for a tread according to one alternative form of the disclosure.

FIG. 1 is a partial plan view when new of a tread pattern design for a tread according to a first alternative form of the disclosure.

The tread 1 according to the disclosure is intended to form part of a tire of size 315/70 R22.5 intended to equip the drive axle of a heavy vehicle. This tread 1 has a tread surface 10 when new which is shown partially in FIG. 1. This tread has a width W measured in the axial direction and equal to 270 mm.

This tread 1 comprises a directional tread pattern design that imposes a direction of running. This tread pattern design comprises two main grooves 2 of circumferential overall orientation and having a geometry that zigzags slightly about the circumferential direction; these main grooves 2 open onto the tread surface 10 when new and are formed on each side of the equatorial midplane indicated by its line XX' in this figure. These two main grooves 2 between them delimit a middle region M of which the width Lm measured between the axially innermost walls of the main grooves 2 is equal in this instance to 159 mm (namely 59% of the total width W). These main grooves 2 have a mean width equal to 9 mm on the tread surface when new and a width of 4 mm at a maximum depth equal to 13.5 mm.

Formed axially on the outside of each main groove 2 is an edge region B provided with a plurality of oblique grooves 3. These oblique grooves 3 delimit a plurality of blocks 31 that have no sipes at all.

The middle region M further comprises three circumferentially oriented sipes 41, 42, 43 opening onto the tread surface when new, each of these sipes being extended into the thickness of the tread by channels 51, 52, 53 respectively, these channels being intended to form new grooves when the tire becomes part worn. These channels are visible in FIG. 2 which shows a cross section through the tread.

In the case of this first alternative form, the total volume void ratio when new is equal to 9.6% whereas the volume void ratio of the middle region when new is equal to 3.0%. The total volume void ratio is calculated when the tread is new by summing the volumes of the circumferential grooves and the transverse grooves and the volumes of the channels.

Furthermore, the middle region is provided with a plurality of oblique sipes 6 forming a general V-shaped pattern between the two circumferential grooves. These oblique sipes are arranged at a mean spacing Pm equal to 25.1 mm. These oblique sipes 6 have a mean width equal to 0.6 mm and open into the main grooves 2 and into the circumferential sipes 6 of the middle region M. Furthermore, these oblique sipes 6 open into the channels 51, 52, 53 formed in the thickness of the tread.

Figure 2:
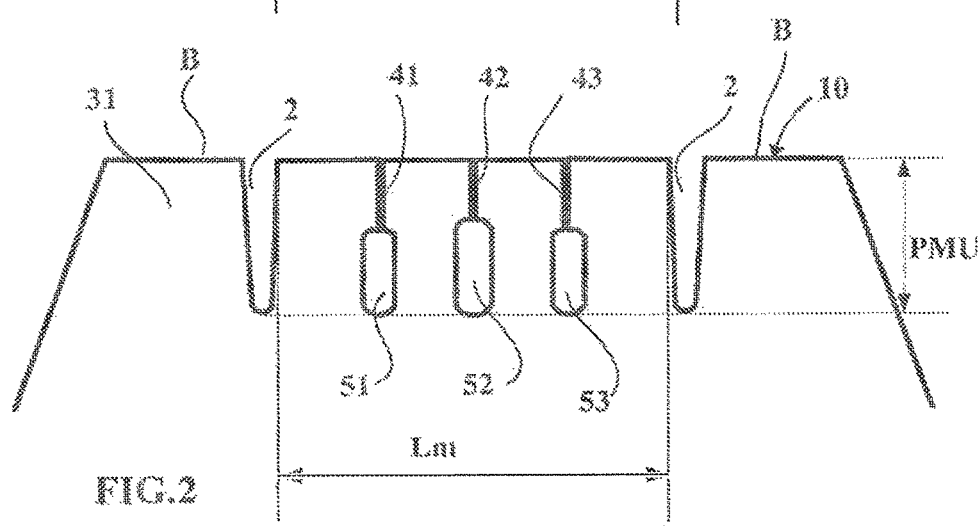
FIG. 2 is a view in cross section on a plane perpendicular to the plane of FIG. 1 and passing through the line II-II.

FIG. 2 is a view in cross section on a plane perpendicular to the plane of FIG. 1 and of which the line in this FIG. 1 is depicted by the line II-II.

In this FIG. 2 it may be seen that the middle channel 52 forms a new groove when part-wear reaches 48% whereas the other new grooves are formed by the other channels 51, 53 when part-wear reaches 56%. These percentages of wear are evaluated with respect to the wearable thickness PMU of material. The central channel 52 has a mean width of 4.5 mm and a total height of 7 mm. The other two channels 51, 53 have a width of 4.5 mm and a height of 6 mm. The innermost points of these channels 51, 52, 53 are at the same depth in the tread as the innermost points of the main grooves 2.

Figure 3:
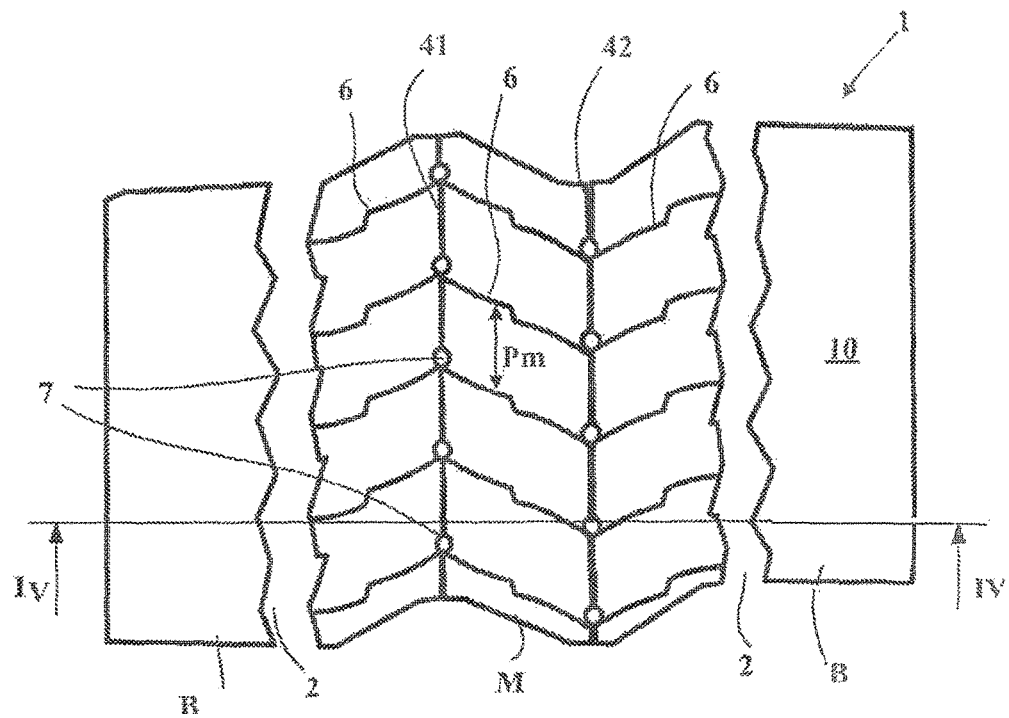
FIG. 3 is a plan view of a tread pattern design for a tread according to another alternative form of the disclosure.
Figure 4:
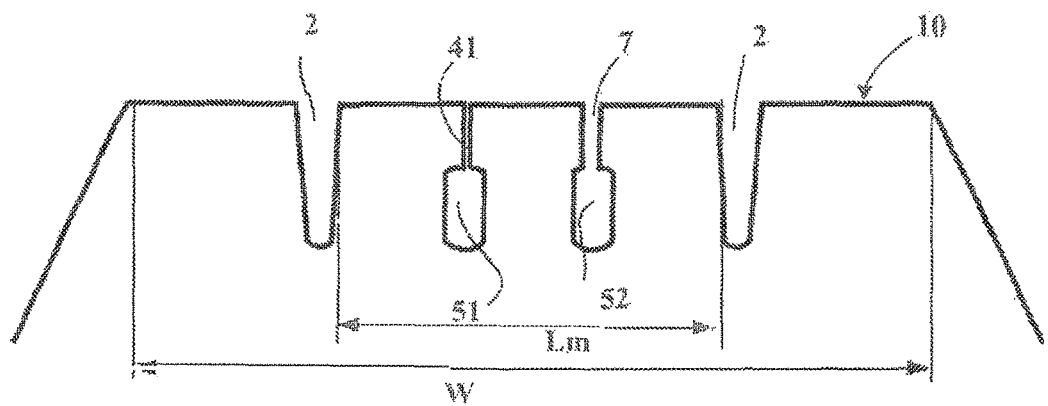
FIG. 4 shows a cross section on a plane perpendicular to the plane of FIG. 3 and passing through the line IV-IV.

In another alternative form shown in FIG. 3 and FIG. 4, a tread 1 according to the disclosure for a heavy vehicle tire of size 11R22.5 comprises two circumferential main grooves 2 dividing the tread width-wise into a middle region M of width Lm equal to 121 mm (namely 54% of the total width W of the tread) and edge regions B of width equal to 42 mm. These main grooves 2 have a mean width equal to 13 mm and a depth equal to 15.5 mm. The relief angle on the walls of the grooves is equal to 16 degrees with respect to a direction perpendicular to the tread surface 10.

The middle region M further comprises two rectilinear sipes 6 of circumferential orientation opening onto the tread surface 10 when new, each of these sipes being extended into the thickness of the tread by the channels intended to form new grooves after 51% wear is reached (this percentage is measured with respect to the wearable thickness PMU of material). Each channel has a mean width equal to 5 mm and a height equal to 8 mm.

Furthermore, the middle region M is provided with a plurality of oblique sipes 6 in a general zigzag pattern between the two main grooves 2. These oblique sipes 6 open into the main grooves and intersect the circumferential sipes 41, 42. These oblique sipes 6 are arranged with a mean spacing Pm equal to 28.7 mm. Each oblique sipe 6 extends into the thickness of the tread as far as a channel 51, 52, these channels being intended to form new grooves after a predetermined degree of partial wear is reached.

Formed at each intersection between an oblique sipe 6 and a circumferential sipe 41, 42 is a radially directed well 7 itself connected to an underlying channel (well diameter equal to 5 mm).

In the case of this second alternative form, the total volume void ratio is equal to 9.37% whereas the volume void ratio of the middle region is equal to 2.77%. The total volume void ratio is calculated when the tread is new by summing the volumes of the circumferential main grooves 2 and the volumes of the channels 51, 52 and those of the radial wells 7 and of the sipes 41, 42, 6.

Formed axially on the outside of each main groove 2 is an edge region B that has no sipe or groove at all.

FIG. 4 shows a cross section on a plane perpendicular to the plane of FIG. 3, this plane passing through the line IV-IV visible in FIG. 3. It may be seen that two channels 51, 52 are molded in the middle part, these channels being intended to form new grooves when the tread becomes part worn so as to ensure lasting performance in terms of the removal of any water that may be present on the roadway.

Of course, the disclosure is not restricted to the examples described and depicted and various modifications can be made thereto without departing from the scope defined by the claims.

The invention claimed is:

1. A tread for a heavy vehicle tire, said tread having:
    a total width W and being provided with two main grooves of circumferential overall orientation,
    said main grooves dividing said tread into three regions including a middle region (M) and two edge regions (B) axially on each side of said middle region,
    said middle region (M) having an axial width Lm at least equal to 45% and at most 70% of the total width W of said tread,
    said tread having a total void volume V0 when new,
    said middle region of this tread having a total void volume Vm when new,
    a volume void ratio being calculated as a ratio between said total void volume V0 and a total volume including all voids and evaluated between said tread surface when new and an internal surface extending in said tread parallel to said tread surface when new,
    said volume void ratio of said tread when new being less than 17%,
    said internal surface being in contact radially on an inside with innermost points of deepest ones of said main grooves,
    said middle region comprising a plurality of transverse or oblique sipes having a depth at least equal to 75% of the depth of said main grooves,
    said transverse or oblique sipes opening into said main grooves delimiting said middle region (M) and being formed at a mean spacing Pm,
    wherein said middle region has a volume void ratio when new less than half said total volume void ratio of said tread when new and wherein at least one channel is formed under said tread surface when new so that it appears when said tread becomes part worn and forms a new groove, and
    said at least one channel formed under said tread surface extending circumferentially continuously entirely around said tread.

2. The tread according to claim 1 wherein said edge regions are circumferentially continuous ribs with no sipes or grooves at all.

3. The tread according to claim 1 further including, in said middle region, at least two circumferential sipes, said at least two circumferential sipes extending into said tread by widened parts forming channels, said channels forming new grooves when said tread reaches a predetermined level of part wear.

4. The tread according to claim 1 wherein at least one channel formed in said middle region appears at the latest when a degree of part wear reaches 60% of said depth of said main grooves.

5. The tread according to claim 1 further including at least one circumferential sipe extending radially from said tread surface to said at least one channel formed under said tread surface and extending circumferentially continuously entirely around said tread.

6. A tread for a heavy vehicle tire, said tread having:
    a total width W and being provided with two main grooves of circumferential overall orientation, said main grooves dividing said tread into three regions including a middle region (M) and two edge regions (B) axially on each side of said middle region, said middle region (M) having an axial width Lm at least equal to 45% and at most 70% of the total width W of said tread, said tread having a total void volume V0 when new, said middle region of this tread having a total void volume Vm when new, a volume void ratio being calculated as a ratio between said total void volume V0 and a total volume including all voids and evaluated between said tread surface when new and an internal surface extending in said tread parallel to said tread surface when new, said volume void ratio of said tread when new being less than 17% said internal surface being in contact radially on an inside with innermost points of deepest ones of said main grooves, said middle region comprising a plurality of transverse or oblique sipes having a depth at least equal to 75% of the depth of said main grooves, said transverse or oblique sipes opening into said main grooves delimiting said middle region (M) and being formed at a mean spacing Pm, wherein said middle region has a volume void ratio when new less than half said total volume void ratio of said tread when new and wherein at least one continuous circumferential channel is formed under said tread surface when new so that it appears when said tread becomes part worn and forms a new groove, and wherein said edge regions are provided with transversely or obliquely oriented sipes arranged at a mean spacing Ps, said mean spacing Ps being greater than said mean spacing Pm of said sipes in said middle region.

7. The tread according to claim 6 wherein said edge regions are provided with transversely or obliquely oriented sipes arranged at a mean spacing Ps, said mean spacing Ps being at least greater than 1.25 times said mean spacing Pm of said sipes in said middle region.

8. A tread for a heavy vehicle tire, said tread having:

a total width W and being provided with two main grooves of circumferential overall orientation, said main grooves dividing said tread into three regions including a middle region (M) and two edge regions (B) axially on each side of said middle region, said middle region (M) having an axial width Lm at least equal to 45% and at most 70% of the total width W of said tread, said tread having a total void volume V0 when new, said middle region of this tread having a total void volume Vm when new, a volume void ratio being calculated as a ratio between said total void volume V0 and a total volume including all voids and evaluated between said tread surface when new and an internal surface extending in said tread parallel to said tread surface when new, said volume void ratio of said tread when new being less than 17%, said internal surface being in contact radially on an inside with innermost points of deepest ones of said main grooves, said middle region comprising a plurality of transverse or oblique sipes having a depth at least equal to 75% of the depth of said main grooves, said transverse or oblique sipes opening into said main grooves delimiting said middle region (M) and being formed at a mean spacing Pm, wherein said middle region has a volume void ratio when new less than half said total volume void ratio of said tread when new and wherein at least one continuous circumferential channel is formed under said tread surface when new so that it appears when said tread becomes part worn and forms a new groove, and wherein said volume void ratio of said tread when new is less than 10% and wherein said volume void ratio of said middle region when new is at most equal to 3%.

9. A tire provided with a tread according to claim 1.

* * * * *